(12) United States Patent
Sterman et al.

(10) Patent No.: US 9,906,567 B2
(45) Date of Patent: Feb. 27, 2018

(54) SYSTEMS AND METHODS OF ROUTING IP TELEPHONY DATA PACKET COMMUNICATIONS

(71) Applicant: VONAGE NETWORK, LLC, Holmdel, NJ (US)

(72) Inventors: Baruch Sterman, Efrat (IL); Chakrapani Gorrepati, Morganville, NJ (US); Tzahi Efrati, Givataim (IL); Yariv Trabelsi, Jerusalem (IL)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 13/627,641

(22) Filed: Sep. 26, 2012

(65) Prior Publication Data
US 2014/0086061 A1    Mar. 27, 2014

(51) Int. Cl.
*H04W 72/04* (2009.01)
*H04L 29/06* (2006.01)
*H04L 12/725* (2013.01)

(52) U.S. Cl.
CPC ........ *H04L 65/1069* (2013.01); *H04L 45/302* (2013.01); *H04L 45/3065* (2013.01); *H04L 65/102* (2013.01); *H04L 65/80* (2013.01)

(58) Field of Classification Search
CPC ...................................................... H04L 12/66
USPC ........ 370/235, 238, 141, 250, 254, 338, 401
See application file for complete search history.

(56) References Cited

U.S. PATENT DOCUMENTS

| | | | |
|---|---|---|---|
| 6,907,000 B1 | 6/2005 | Host | |
| 6,934,258 B1 | 8/2005 | Smith et al. | |
| 7,099,277 B2 | 8/2006 | Sahinoglu et al. | |
| 7,502,337 B2 * | 3/2009 | Kosanovic et al. | 370/286 |
| 7,843,842 B2 * | 11/2010 | Ethier et al. | 370/248 |

(Continued)

FOREIGN PATENT DOCUMENTS

| | | |
|---|---|---|
| WO | 2005003884 A2 | 1/2005 |
| WO | 2005013562 A1 | 2/2005 |
| WO | 2008/005274 | 1/2008 |

OTHER PUBLICATIONS

Internet Engineering Task Force RFC3261, "SIP: Session Initiation Protocol", J. Rosenberg et al., Jun. 2002.

(Continued)

*Primary Examiner* — Edan Orgad
*Assistant Examiner* — Nourali Mansoury
(74) *Attorney, Agent, or Firm* — Nixon & Vanderhye, P.C.; Joseph Pagnotta

(57) ABSTRACT

Systems and methods of establishing a communications channel between a first telephony device and a second telephony device obtain information about the capabilities of various data network elements that can be used to establish the communications channel. The information about the elements is used to select a combination of elements that are used to establish the communications channel. A communications channel may also be monitored while it is in use. If the requirements for the channel change, the communications channel may also be changed accordingly. If any of the elements become incapable of providing the required level of service or functionality for a communications channel, the element may be removed from the communications channel.

28 Claims, 11 Drawing Sheets

(56) References Cited

U.S. PATENT DOCUMENTS

| | | | |
|---|---|---|---|
| 7,995,464 B1* | 8/2011 | Croak | H04L 41/5009 370/218 |
| 8,027,293 B2* | 9/2011 | Spaur et al. | 370/329 |
| 8,223,720 B1* | 7/2012 | Efrati | H04L 65/1083 370/315 |
| 8,238,294 B2* | 8/2012 | Lee | H04L 12/5695 370/235 |
| 8,565,218 B2* | 10/2013 | Sharma | H04L 45/02 370/351 |
| 2004/0136324 A1 | 7/2004 | Steinberg et al. | |
| 2006/0039397 A1 | 2/2006 | Adiseshu et al. | |
| 2006/0227766 A1* | 10/2006 | Mickle | H04L 29/06027 370/356 |
| 2008/0192732 A1 | 8/2008 | Riley et al. | |
| 2010/0080174 A1* | 4/2010 | Zhu et al. | 370/328 |
| 2010/0114785 A1* | 5/2010 | Dasari et al. | 705/301 |
| 2010/0303070 A1* | 12/2010 | Shigeeda et al. | 370/389 |
| 2012/0196644 A1 | 9/2012 | Scherzer | |
| 2013/0070755 A1* | 3/2013 | Trabelsi et al. | 370/352 |

OTHER PUBLICATIONS

Internet Engineering Task Force RFC3265, "SIP: Session Initiation Protocol (SIP)-Specific Event Notification", A. B. Roach, Jun. 2002.
Internet Engineering Task Force RFC2327, "SDP: Session Description Protocol", M. Handley et al., Apr. 1998.
International Search Report dated Dec. 7, 2007 in International Appl. PCT/US2007/015000.
Written Opinion dated Dec. 7, 2007 in International Appl. PCT/US2007/015000.
Office Action issued in U.S. Appl. No. 11/819,625 dated May 17, 2011.
Final Rejection issued in U.S. Appl. No. 11/819,625 dated Nov. 9, 2011.
Office Action issued in U.S. Appl. No. 11/819,625 dated Mar. 14, 2012.
International Search Report issued in PCT/US2013/061553 dated Jan. 21, 2014.
Written Opinion issued in PCT/US2013/061553 dated Jan. 21, 2014.

* cited by examiner

SYSTEMS AND METHODS OF ROUTING IP TELEPHONY DATA PACKET COMMUNICATIONS

BACKGROUND OF THE INVENTION

The invention is related to Internet Protocol (IP) telephony systems. More specifically, the invention is related to systems and methods for routing the data packets that carry telephony communications, such as audio and video calls, text and video messages, and other forms of data communications. The communications are transmitted, at least in part, by data packets that traverse a private and/or public data network.

When a new telephony communication is being established by an IP telephony system between first and second telephony devices, it is possible for the IP telephony system to specify at least some of the elements which will comprise the communications channel between the first and second telephony devices. The elements which are part of a communications channel could include a wireless access point or some other data network interface that is used by one of the telephony devices to gain access to a data network. The communications channel may also include a service provider that connects the wireless access point or other data network interface device to a public data network, such as the Internet. The communications channel may also include one or more media relays which are used to transmit data packets along the communications channel. In some instances, an inbound proxy server (or originating gateway), and an outbound proxy server (or a destination gateway) may form part of the communications channel. Further, a gateway that is used as an interface between a data network and a publically switched telephone network (PSTN) or a cellular service provider may also be a part of the communications channel.

Typically, the IP telephony system can at least specify the media relays and/or proxy servers which form part of the communications channel which will carry the data packets bearing the media of a telephony communication. However, the IP telephony system will not necessarily have full knowledge regarding the capabilities of all of those elements, or their current data carrying capacity.

Depending on the requirements for a telephony communication, it may be necessary or desirable to perform certain functions or transformations on the data packets as they are communicated between the first and second telephony devices. Those functions or transformations would be performed by one or more of the elements of the data network which make up the communications channel. However, the IP telephony system may not be aware of all of the functional capabilities of all of the elements of the data network which can be used to establish the communications channel. For this reason, the IP telephony system might fail to include an element of the data network in a communications channel because the IP telephony system is unaware that the element can perform a required function or transformation. Likewise, the IP telephony system might include a certain element of the data network in a communications channel, assuming that it can perform a certain function, when in fact it cannot. As a result, the communications channel might perform poorly, or it might fail entirely.

Also, the quality of an IP telephony communication can be highly dependent on how well the data packets carrying the media of the telephony communication are being transmitted over the communications channel. If data packets are being lost, call quality will deteriorate. If transmitted data packets are being significantly delayed, call quality will deteriorate. Another problem is jitter, where the latency or delay is variable in nature. If jitter becomes a problem, call quality also will deteriorate. In many instances, an IP telephony system will not have complete knowledge about the quality of the data connections between the elements that comprise a communications channel. If the IP telephony system has any knowledge, it may only be historical knowledge about the past performance of the elements, and the past performance may not be indicative of the present performance of those elements. It is difficult for an IP telephony system to gather and maintain real-time information about the quality of data connections to and from the elements of a data network which can be used to establish a communications channel between first and second telephony devices.

Recently, some attempts have been made to identify multiple potential communications channels which could be used to communicate the media of an IP telephony communication, and the potential communications channels are tested before a particular communications channel is selected. The testing can be performed by the telephony devices themselves, or by elements of the data network that are in communication with the telephony devices. By testing the functionality of a communications channel before the telephony communication begins, one can avoid selecting a communications channel that will be inoperative, or which will perform poorly. Some such systems and methods for conducting testing of potential communications channels before a particular communications channel is selected are disclosed in U.S. patent application Ser. No. 13/236,065, which was filed on Sep. 19, 2011, the entire contents of which is hereby incorporated by reference.

While it is helpful to test proposed communications channels before an initial communication channel is selected, the proposed communications channels themselves must be selected so that the communications channels are capable of satisfying the functional and quality requirements for the telephony communication. What is needed are systems and methods which obtain information about the elements of a data network which can be used to establish a communications channel, and which use that information to identify combinations of the elements that would provide communications channels satisfying all requirements for a telephony communication.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
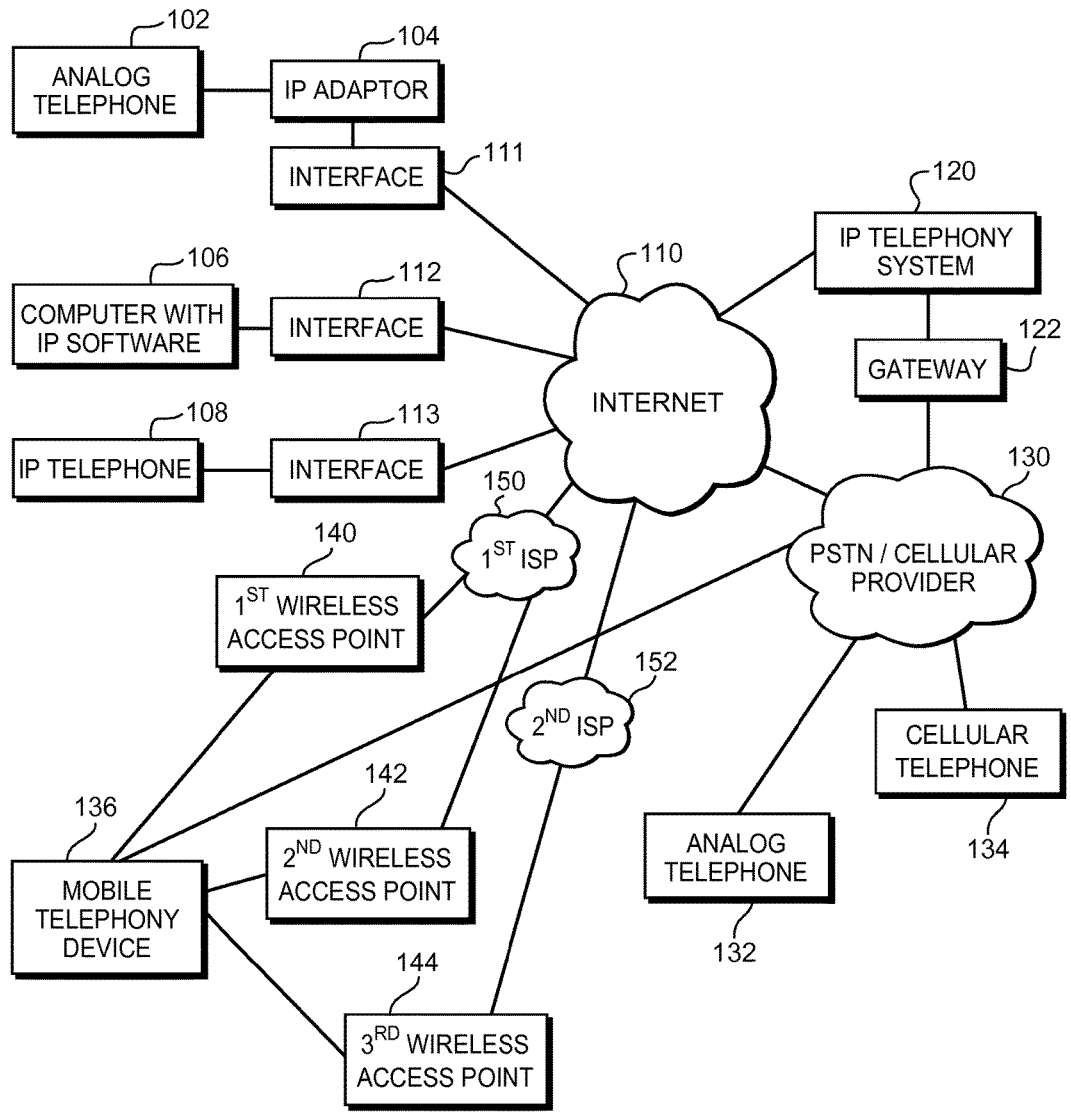
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110 by an interface 113. The interface 113 could be any of multiple devices that are used to obtain access to a data network, such as the Internet 110. In some embodiments, the IP telephone 108 could be connected to the interface 113 via a wired connection. In other instances, the IP telephone 108 could be connected to the interface 113 by a separate wireless router (not shown). In yet other instances, the interface 113 could include its own wireless router.

Alternatively, a customer could utilize an analog telephone 102 which is connected to the Internet 110 via an IP adapter 104, which is itself coupled to an interface 111 that provides access to the Internet. In some embodiments, the functions of the IP adaptor 104 and the interface 111 could be combined into a single unit. The telephone adapter 104 converts analog signals from the analog telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). Here again, the computer 106 is coupled to the Internet via an interface 112. The computer 106 could have a wired or wireless connection to the interface 112. Also, in some embodiments, a separate wireless router (not shown) could be logically interposed between the computer 106 and the interface 112. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call, to send and receive text messages, and to send and receive other forms of communications via an IP telephony system. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1 illustrates that a mobile telephony device 136 is capable of establishing a first wireless data connection with a first wireless access point 140, such as a WiFi or WiMax router. The first wireless access point 140 is coupled to the Internet 110 via a first Internet service provider 150. Thus, the mobile telephony device 136 can establish a VOIP telephone call with the IP telephony system 120 via a path through the Internet 110, the first Internet service provider 150 and the first wireless access point 140.

FIG. 1 also illustrates that the mobile computing device 136 can establish a second wireless data connection with a second wireless access point 142 that is also coupled to the Internet 110 via the first Internet service provider 150. Further, the mobile computing device 136 can establish a third wireless data connection with a third wireless access point 144 that is coupled to the Internet 110 via a second Internet service provider 152. Assuming the mobile telephony device 136 includes cellular telephone capabilities, the mobile telephony device 136 could also establish a data connection to the Internet 110, and then to the IP telephony system 120, via a data channel provided by a cellular service provider 130.

Although not illustrated in FIG. 1, the mobile telephony device 136 may be capable of establishing a wireless data connection to a data network, such as the Internet 110, via alternate means. For example, the mobile computing device 136 might link to some other type of wireless interface using an alternate communication protocol, such as the WiMax standard, or some other standard that is later developed. Also, the wireless access points 140, 142, 144 illustrated in FIG. 1 could operate using any standard that allows a data connection to a data network.

Figure 2:
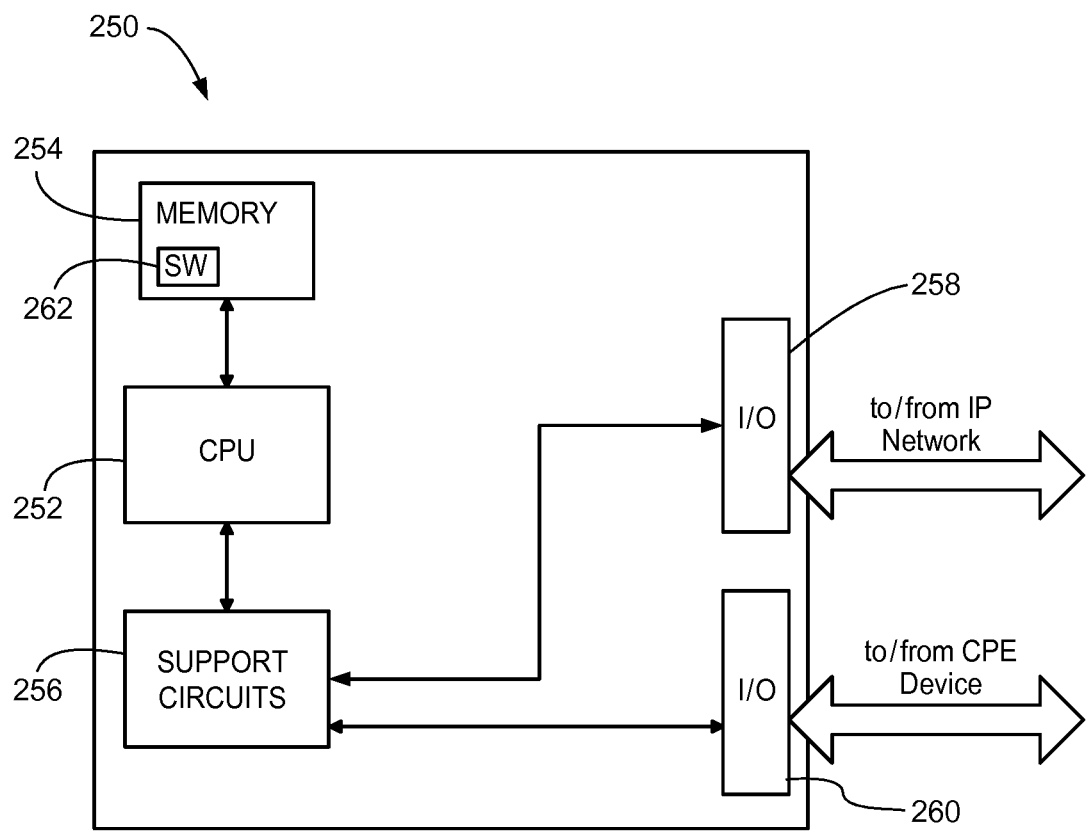
FIG. 2 is a diagram of various elements of a processor that forms part of an IP telephony system.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the VOIP based telephony service 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment and to service provider agent equipment, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

The following description will refer to telephony communications. The term telephony communications is intended to encompass any type of communication that could pass back and forth to a user of an IP telephony system. This includes audio and video telephone calls, text messages, video messages and any other form of telephony or data communication.

Figure 3:
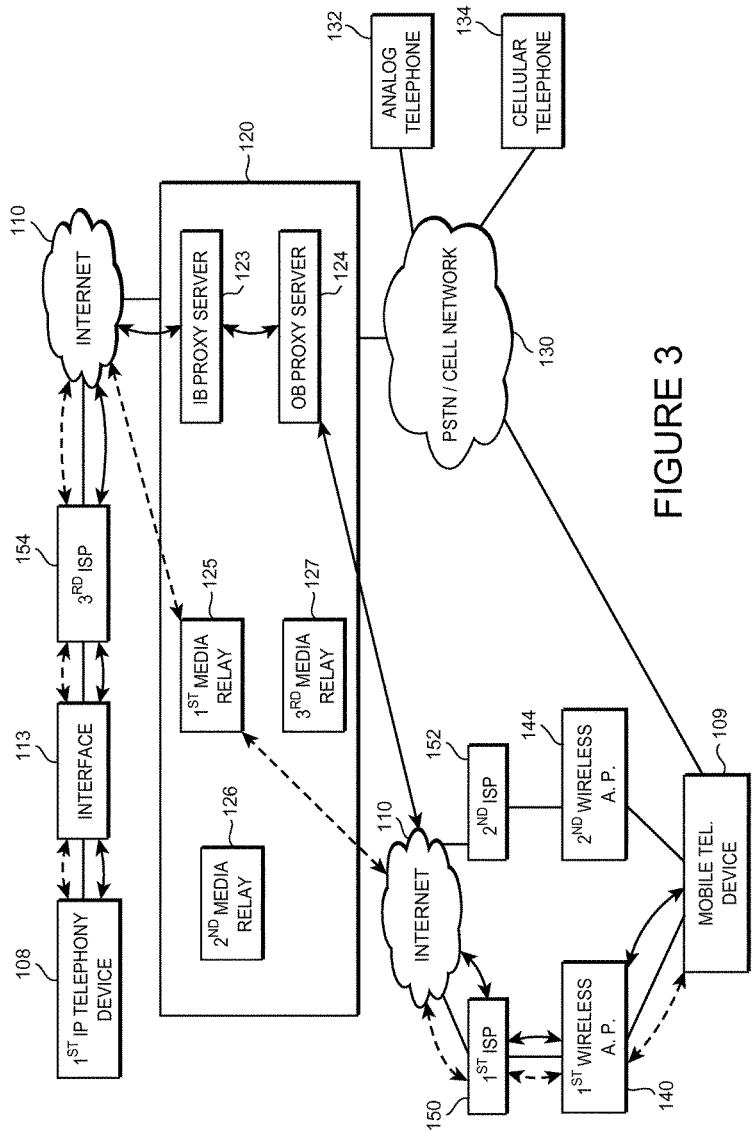
FIG. 3 is a more detailed diagram of a communications environment illustrating the paths that data packets bearing the setup signaling and the media of a telephony communication traverse between first and second telephony devices.

FIG. 3 provides a more detailed depiction of the communications channels that are used to carry the setup signaling and the media of IP telephony communications. A communications channel is defined as a path that will be traversed by data packets as the data packets are communicated between any two points in a data network. Thus, a communications channel can include one or more devices or elements which are used to communicate data packets between two points. A communications channel may be defined in various ways. For example, a communications channel could be defined as a list of the devices that data packets will traverse in passing from a first point to a second point. A communications channel may also be defined by a list of the address information for those devices. For example, a communications channel could be defined or described as a list of IP address for the devices that data packets will traverse, and possibly also the port number of those devices which will be used to communicate the data packets.

FIG. 3 depicts the communications channels that are used to setup a telephony communication between a first IP telephony device 108 and a mobile telephony device 109. The solid lines with arrows indicate the path traversed by data packets bearing the setup signaling used to setup a telephony communication. The dashed lines with arrows indicate the path traversed by data packets bearing the media of the telephony communication. The following description refers to setting up a telephone call between the first IP telephony device 108 and the mobile telephony device 109. However, the same general principles apply to setting up and conducting other forms of telephony communications.

As illustrated in FIG. 3, when the first IP telephony device 108 wishes to setup a telephone call to the mobile telephony device 109, call setup signaling is sent from the first IP telephony device 108 through the data network interface 113, through the third Internet service provider 154, and into the Internet 110. The data packets bearing the call setup signaling are addressed to an inbound proxy server 302 of the IP telephony system 120. The call setup signaling is received by the inbound proxy server 302, which interprets the call setup signaling to determine who the calling party is attempting to reach.

The inbound proxy server 302 consults with a routing unit (not shown) of the IP telephony system 120 to determine the identity of an outbound proxy server 304 which is capable of setting up the call to the called telephony device, in this case, the mobile telephony device 109. As illustrated in FIG. 3, the outbound proxy server 304 sends call setup signaling through the Internet 110, and a first Internet service provider 150 to a data network interface 140 which is in communication with the mobile telephony device 109. In this instance, the data network interface is a first wireless access point 140. The call setup signaling ultimately reaches mobile IP telephony device 109, which indicates that it is willing to accept the incoming call.

The call setup signaling that passes back and forth along the solid lines with arrows in FIG. 3 is used to inform the first IP telephony device 108 and the mobile telephony device 109 about how to communicate data packets bearing the media of the telephone call. This can include an indication of the coding which should be used in the data packets, as well as the identity and/or IP address of one or more media relays which will be used to communicate the data packets bearing the media of the call.

In the example illustrated in FIG. 3, the first IP telephony device 108 and the mobile telephony device 109 are instructed to communicate data packets bearing the media of the call with the first media relay 306. Both devices will then send the media data packets to the first media relay 306, as illustrated by the dashed lines with arrows, and the first media relay 306 forwards the data packets on to the other telephony device.

In the example illustrated in FIG. 3, only a single media relay is used to help exchange the data packets bearing the media of the call between the first IP telephony device 108 and the mobile telephony device 109. However, in alternate call scenarios, multiple media relays may be used to communicate the data packets. Also, in the example illustrated in FIG. 3, the first media relay 306 is part of the IP telephony system. In alternate call scenarios, a media relay that is operated by a third party (not shown) could be used to help communicate the data packets bearing the media of a call.

Also, although the example illustrated in FIG. 3 has the call setup signaling traversing a different communications channel than the data packets bearing the media of the call, in alternate embodiments the data packets bearing the media of the call may also pass through the inbound proxy server 302 and the outbound proxy server 304 along the same communications channel as the call setup signaling.

Figure 4:
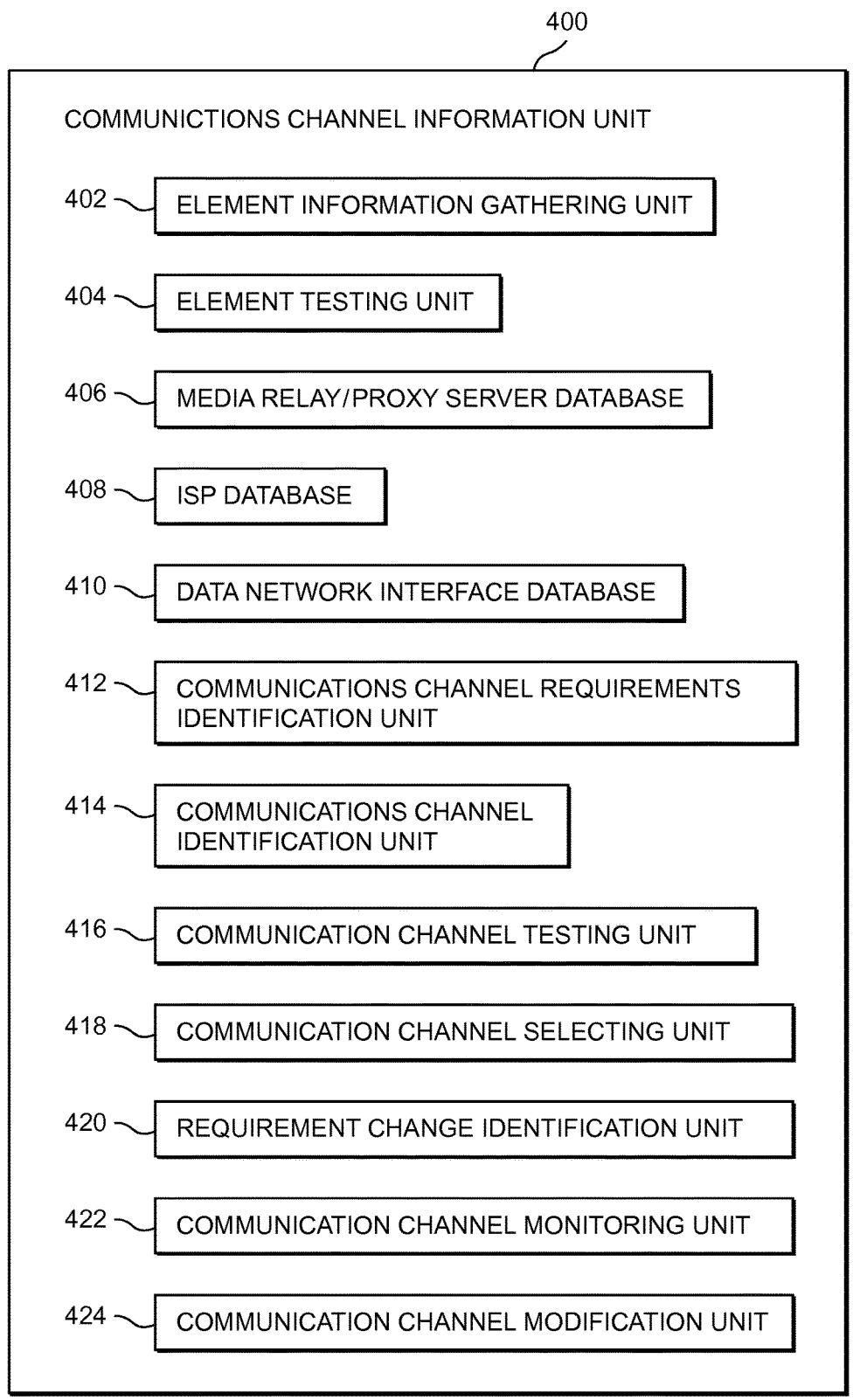
FIG. 4 is a block diagram illustrating elements of a communication channel information unit embodying the present technology, which is a part of an IP telephony system.
Figure 5:
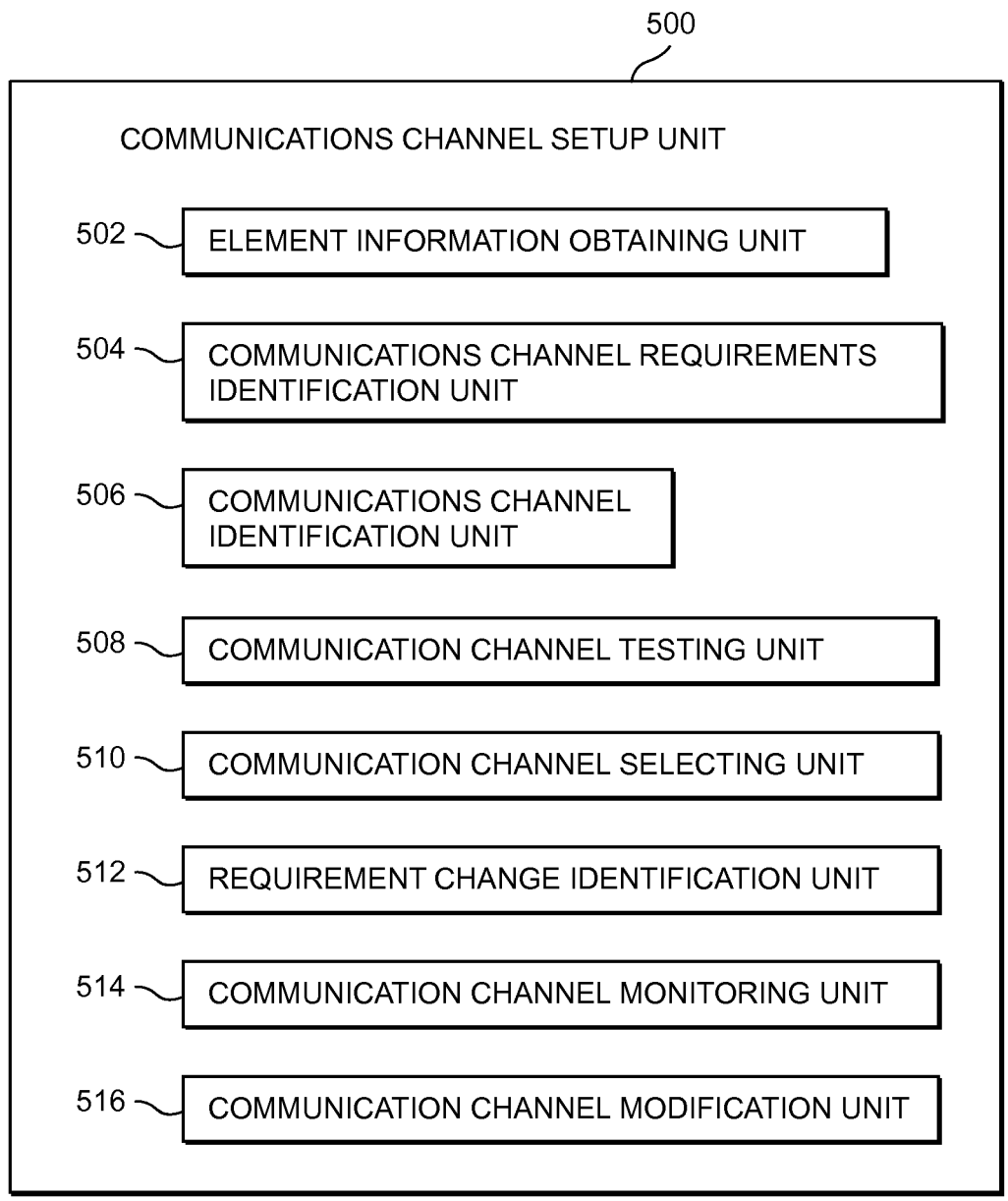
FIG. 5 is a block diagram illustrating elements of a communication channel setup unit that could be embodied in a software application that is present on or executed by an IP telephony device.

The communications channel that is selected for the data packets bearing the media of the call can be determined by either a communications channel information unit 400, as illustrated in FIG. 4, which is part of the IP telephony system 120, or by a communications channel setup unit 500, as illustrated in FIG. 5 (discussed in greater detail below), which is present on either the first IP telephony device 108 or the mobile telephony device 109. If a communications channel setup unit 500 on the first IP telephony device 108 or the mobile telephony device 109 determines the communications channel, it may do so with information obtained from the communications channel information unit 400 of the IP telephony system. Also, in some embodiments, a communications channel setup unit 500 on the first IP telephony device 108 may act in concert with a communications channel setup unit 500 on the mobile telephony device 109 to select the communications channel that will be used to communicate the data packets bearing the media of a telephony communication.

The following description refers to "elements" of a data network which are used to communicate the data packets of IP telephony communications. An element could be any device or software client that is responsible for communicating the data packets of telephony communications. The term "element" is intended to encompass media relays, proxy servers, data network interface devices, Internet service providers, and any other devices and software clients which act to communicate data packets. An element may only be responsible for receiving and transmitting or re-transmitting data packets. However, elements may also be configured to accomplish various functions.

For example, an element such as a media relay may apply algorithms to the data contained in data packets bearing the media of a telephony communication to accomplish functions such as noise reduction, echo cancellation or other modifications designed to improve the overall user experience. An element may also be responsible for converting data contained in data packets from a first format to a second format, thus acting as an interface between two devices which communicate using different data formats or encoding techniques. Elements may also operate on the data contained in data packets to accomplish a variety of other functions.

FIG. 4 illustrates elements of a communications channel information unit 400 which can be part of an IP telephony system 120. The communications channel information unit 400 obtains and stores information about the elements of a data network which can be used to establish communications channels for IP telephony communications. This information can be used by the communications channel information unit 400 itself to select a communications channel for a telephony communication. Also, the communications channel information unit 400 can provide the stored information to the communications channel setup units 500 of various telephony devices to assist them in selecting a communications channel for an IP telephony communication.

The communications channel information unit 400 includes an element information gathering unit 402. The element information gathering unit 402 obtains information regarding various elements of a data network, such as media relays, proxy servers, data network interface devices and others. The information could relate to the capabilities or functionality offered by each of those elements. The information could also relate the quality of data connections that one element has with one or more other elements of the data network. The information may also be indicative of the quality of a data connection that an element has with a telephony device. The information could also relate to the cost of using a particular element to carry a telephony communication.

For example, the information obtained regarding the various elements could include the CODECs that the element can support and the capabilities that the element can provide with respect to converting data formatted according to a first CODEC into a second CODEC. The information could also include information about the data communication capabilities of the elements, such as the jitter, delay, and packet loss that typically occurs for data traversing an element. This information could also include conferencing capabilities, noise reduction capabilities, and echo cancellation capabilities.

The "quality" of a data connection refers to various aspects of the data connection. The term "quality" is intended to encompass the speed (bit rate) of data transmissions, as well as other objective measures of the data communications between two devices, such as packet loss, latency, jitter and other aspects. The term "quality" may refer to a single one of those aspects, or a combination of those aspects.

The information that is collected could also include information about how a particular channel behaves when carrying data between different locations. For example, a certain channel might provide a first level of quality or performance when carrying data traffic passing between the United States and Israel, but provide a second, different level of quality or performance when carrying data between the United Kingdom and Egypt.

The information that is collected could also relate to the time at which quality measurements were made. As is known to those skilled in the art, the quality provided by individual elements, or by channels, may vary based on the time of day or the day of the week. Historical records of call quality through individual elements or channels may also be used to decide which elements to use to create a channel. A channel or an individual element may provide good quality at the present time, but historical data may indicate that quality is about to deteriorate.

Another form of information that may be collected relates to user-reported call quality. A user may be queried after a call is completed to determine the user's subjective impression of call quality. That information can then be recorded against the elements that were involved in carrying the media of the call.

The information about the elements that is obtained by the element information gathering unit is stored in one or more databases. FIG. 4 shows that the communications channel information unit 400 includes a media relay/proxy server database 406, an Internet service provider database 408 and a data network interface database 410. Each of those databases is configured to store the items of information which can be obtained about those types of devices. However, the communications channel information unit 400 may include a variety of other databases which store information about other types of elements of a data network. Further, in some embodiments, a single database may be used to store information about multiple different types of elements.

The information that is obtained by the element information gathering unit 402 may be reported by the elements themselves. In some instances, a company or system that operates one or more elements may compile information about the elements under its control, and that information could be reported to the communications channel information unit 400 in periodic reports. In some instances, the element information gathering unit 402 may send queries to various elements, asking the elements for information about their capabilities or the quality of the data connections they have to other elements of the data network. The responses to those queries are received by the element information gathering unit 402. The element information gathering unit 402 then extracts relevant information from those responses and stores the information in one or more databases.

Also, an element testing unit 404 may be used to test various elements to obtain information about the elements. The information that results from such testing would then be stored in one or more databases. For example, the element testing unit 404 might measure the quality of the data connections provided by an element by sending test data through the element. The element testing unit 404 would then measure the quality of the data communications passing to or from the element, and that information on the quality of the communications would be stored in a database.

Although the above explanation focused on obtaining and recording information relating to an element's functional capabilities and the quality of data connections to the element, other items of information about an element could also be obtained and stored in databases. For example, the recorded information could include the name, type, model, version and manufacturer of an element. The recorded information could also include the type and version of any software that is running on an element. The recorded information could also include the deployment date of an element, the date or dates when any software on the element was last updated. Further, the recorded information could include information about who owns and/or controls an element.

As noted above, in some instances, the communications channel information unit 400 is responsible for selecting a communications channel for a telephony communication. If that is to occur, various elements operate to identify and select the communications channel.

The communications channel information unit 400 also includes a communications channel requirements identification unit 412. The communication channel requirements identification unit 412 is responsible for determining the basic requirements for a communications channel that is to carry the data packets bearing the media of a telephony communication. For example, when a first telephony device requests that a telephone call be established to a second telephony device, the communications channel requirements identification unit 412 sets the minimum requirements for the data packet communications that will carry the media of the telephone call. This could include a minimum bit rate, and possibly minimum requirements with respect to various quality measures, such as packet loss, and jitter.

The minimum requirements may also include functional requirements, such as the need to re-format data packets as the data packets are transmitted between the first and second telephony devices. The functional requirements may also include the need to conduct echo cancellation or the need to conduct noise reduction, as well as the need to perform other operations on the data packets. The minimum functional requirements could include conferencing requirements, and/or requirements relating to a need to synchronize audio and video streams. Further, the functional requires could include voice manipulation requirements to provide a certain level of perceived call quality.

In some instances, the functional requirements could include a need to record conversations for law enforcement. Also, some calls may include a requirement that management be able to listen to an ongoing call, such as in calls centers, were management listens to a call in real time to monitor a call center employee's performance. Similarly, call center management may need to listen to recorded conversations, or transcripts, for similar purposes.

The minimum requirements might also be related to the cost of connecting the call or of delivering some other form of telephony communication.

The minimum requirements for a communications channel could be dependent on the type of telephony communication that will traverse the communications channel. The minimum requirements may also depend, at least in part, on an identity of the parties involved in the telephony communication. For example, some users of an IP telephony system might pay extra to receive superior quality communications. Thus, the communications channel requirements identification unit 412 may need to obtain information about the identity of the parties involved in the telephony communication, and well as information about whether the involved parties are to be provided any special consideration.

Once the minimum requirements for a communications channel have been established by the communication channel requirements identification unit 412, the communications channel identification unit 414 attempts to identify one or more communications channels that can satisfy the minimum requirements. This is done by identifying the elements of the system that can act together to accomplish the transfer of data packets bearing the telephony communication. In some instances, identifying the communications channel may include identifying all of the elements in the chain between the first and second telephony devices. In other instances, identifying the communications channel may only involve identifying a single element which will act to relay data packets between the first and second telephony devices, such as a media relay.

For example, the minimum requirements for a communications channel may include a requirement that echo cancellation be performed, and a requirement that the data in the data packets be converted from a first CODEC to a second CODEC. The communications channel identification unit 414 might review the information contained in the media relay/proxy server database 406 to identify media relays that can provide this functionality.

The communication channel information unit may also include a communication channel testing unit 416 which tests communications channels. The testing could be conducted offline, such as during off-peak hours, to determine the capabilities of various elements that make up a communications channel. In other instances, the communications channel identification unit 414 might identify multiple different communications channels that could be used to carry a telephony communication, and the communications channel testing unit 416 could test each of the channels to determine which of the channels provide the best service before one of the communications channels is selected for use in carrying the telephony communication.

The testing that is conducted by the communication channel testing unit could take many different forms. The testing could be a test of communications quality and/or a test of the ability of a communications channel to perform certain functions. The testing could be loop testing, where an element sends packets to itself via one or more interim elements. To test for echo cancellation and noise reduction, test packets which have those problems could be sent to through an element that should provide echo cancellation and/or noise reduction to determine how well the element performs in providing those capabilities.

Testing for quality could include tests for packet loss, jitter, latency, and for bandwidth constraints. Of course, other testing could also be conducted to help establish the quality offered by a particular element or a channel.

If an element is capable of supporting several different CODECS, multiple tests could be performed, one for each CODEC, to verify the element's ability to actually support all CODECS. In the same fashion, if an element can provide CODEC translations, one or more tests could be performed on the element to verify that the element can properly transcode between CODECS.

A test of a communications channel could be an end-to-end test of the entire communications channel, or a test of one or two elements of the communications channel.

Once the testing is conducted, the communications channel selecting unit 418 selects one of the identified communications channels for use as the initial communications channel to carry a telephony communication, and the communications channel is put into use.

In the example illustrated in FIG. 3, a single media relay 306 is used to help communicate data packets bearing the media of the telephony communication between the first IP telephony device 108 and the mobile telephony device 109. However, in other instances, it may be necessary to use additional or alternate media relays to provide additional or alternate functionality.

Figure 6:
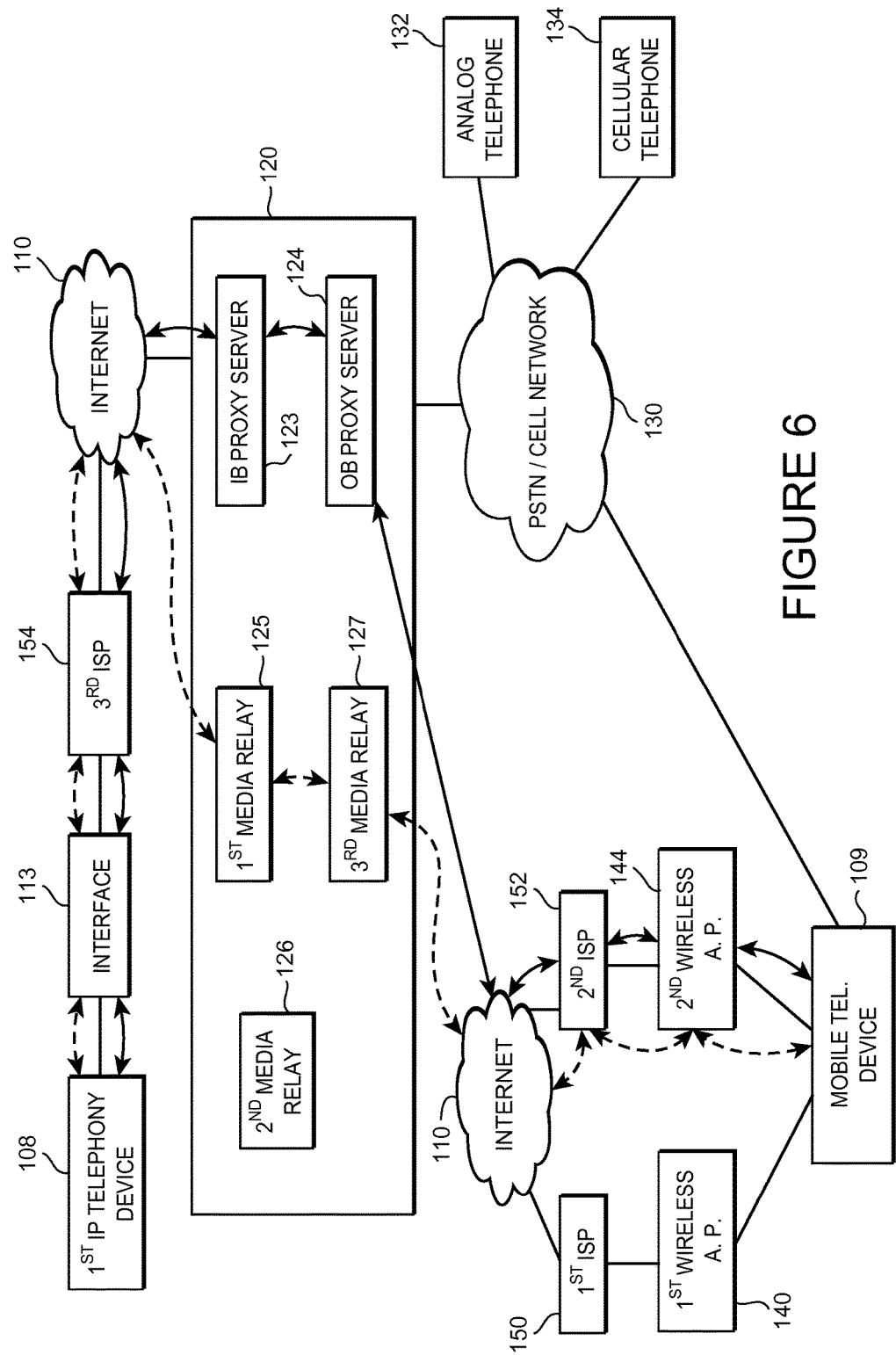
FIG. 6 is a diagram of a communication environment illustrating the path of a first communications channel for communicating the media of an IP telephony communication between first and second telephony devices.

For example, and with reference to FIG. 6, assume that the communications channel identification unit 414 finds that the first media relay 306 can perform echo cancellation, but not the conversion between the first and second CODECs. Assume also that a third media relay 602 can provide the data conversion, but not the echo cancellation. Under those circumstances, the communications channel identification unit 414 identifies a communications channel that includes both the first media relay 306 and the third media relay 602. FIG. 6 illustrates that the data packets bearing the media of a telephony communication between the first IP telephony device 108 and the mobile telephony device 109 traverse such a communications channel, which includes the first media relay 306 and the third media relay 602. This communications channel is different from the communications channel illustrated in FIG. 3, which does not include the third media relay 602.

In another example, assume that a telephone call is to be conducted with a user who has paid to obtain high quality telephone calls. Assume also that it will be necessary to convert the data packets from the first CODEC to the second CODEC, as in the previous example. When the communications channel requirements identification unit 412 establishes the minimum requirements for the call, it will include a requirement that the call traverse elements that can provide a high transmission speed, with very low packet loss or jitter, and that at least one of the elements in the communications channel be capable of providing the data conversion between CODECS.

Figure 7:
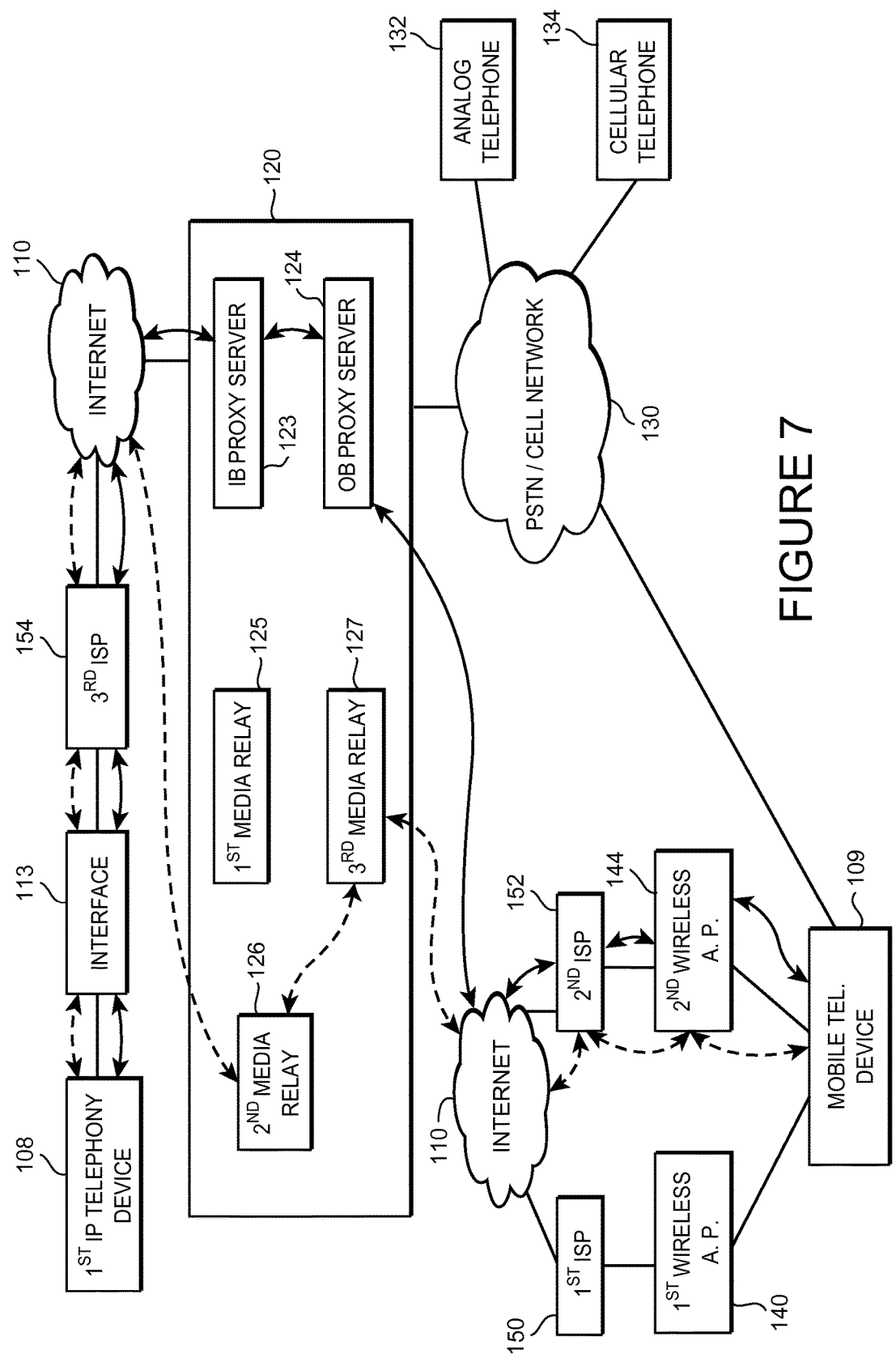
FIG. 7 is diagram of a communication environment illustrating the path of an alternate communications channel for communicating media of an IP telephony communication between first and second telephony devices.

Assume also that when the communications channel identification unit 414 reviews the information stored in the databases, it finds that the first media relay 306 is incapable of supporting data communications that meet this relatively high quality level. However, the information in the databases indicates that the second media relay 604 and the third media relay 602 can support data communications that meet the high quality requirement. Further, the second media relay cannot provide the CODEC translation. Under these circumstances, the communications channel identification unit 414 identifies a communications channel that includes the second media relay 604 and the third media relay 602. FIG. 7 illustrates such a communications channel, which passes through the second media relay 604 and the third media relay 602.

As noted above, the communications channel identification unit 414 may also specify that certain other elements be included in a communications channel. For example, an identified communications channel could include specific data network interface devices and specific Internet service providers, as well as other elements.

For example, FIG. 7 shows that the mobile telephony device 109 is capable of accessing the Internet 110 via either the first wireless access point 140 or the second wireless access point 144. The first wireless access point 140 utilizes a first Internet service provider 150 to access the Internet 110, whereas the second wireless access point 144 uses a second Internet service provider 152 to access the Internet.

The Internet service providers 150, 152 may differ in their respective capabilities. For example, the second Internet service provider 152 may be capable of providing a higher quality data connection to the third media relay 602 than the first Internet service provider 150. This information would be reflected in the Internet service provider database 408 maintained by the communications channel information unit 400. In the example given above, relatively high call quality was a minimum requirement for a telephone communication to a user who had paid to receive high quality. Under those circumstances, the communication channel identification unit 414 might specify that the communications channel include the second wireless access point 144, because that will result in the data packets being carried onto and off the Internet 110 by the second Internet service provider 152 which is capable of establishing a high quality data connection to the third media relay 602.

Figure 8:
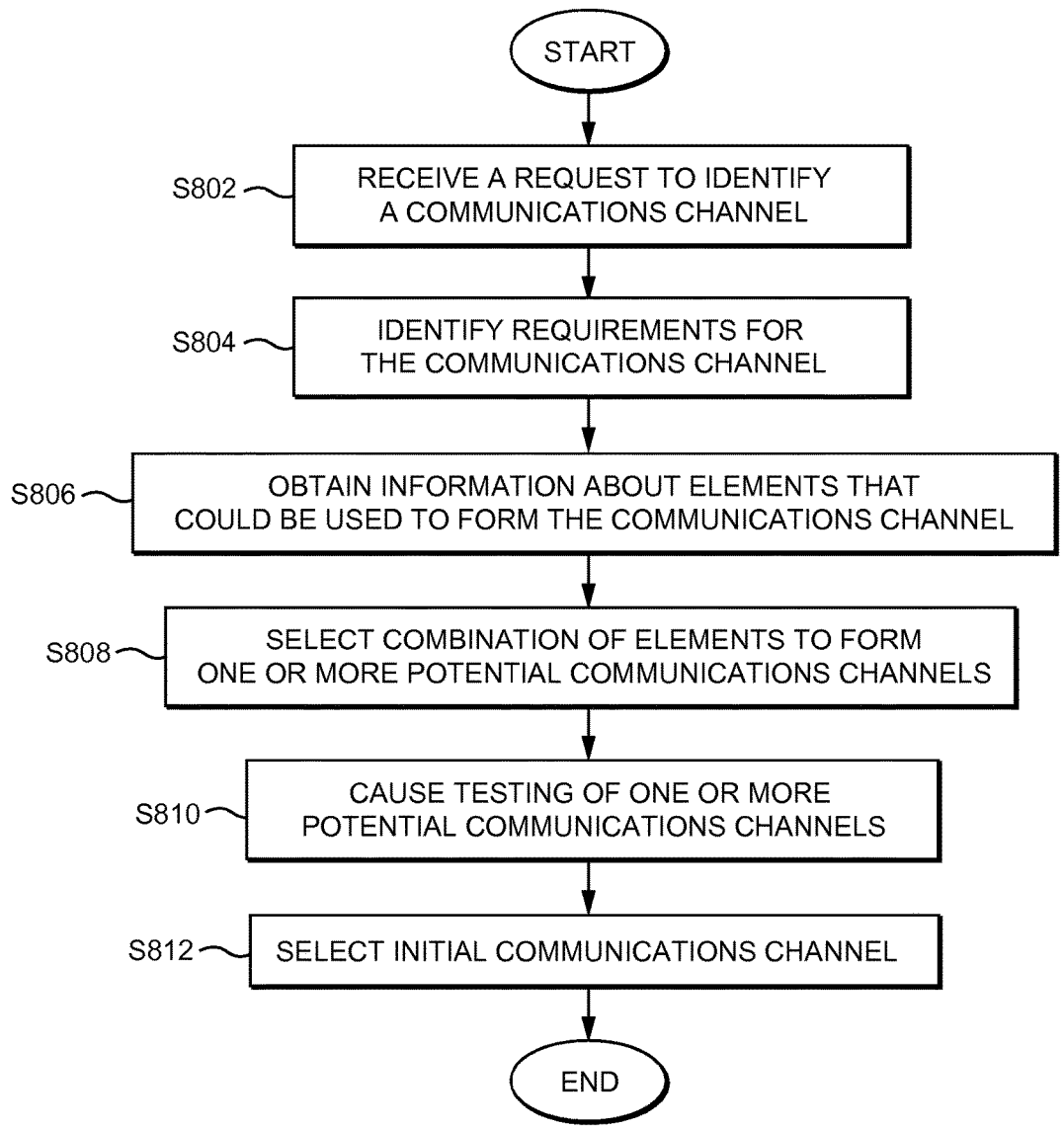
FIG. 8 is a flowchart illustrating steps of a method embodying the invention for selecting an initial communications channel for communicating the media of an IP telephony communication.

FIG. 8 illustrates steps of a method that would be performed by the communications channel information unit 400 of an IP telephony system 120 to select an initial communications channel for a telephony communication. The method begins and proceeds to step S802 where a request to set up a telephony communication is received. In step S804, the communications channel requirements identification unit 412 determines the minimum requirements for the communications channel. In step S806, the communications channel identification unit 414 obtains information about the elements that could be used to form the communications channel. In step S808, the communications channel identification unit 414 uses this information to select one or more combination of elements that could form one or more communications channels that satisfy the requirements.

In step S810, the communications channel testing unit 418 tests the identified communications channels. If only one channel has been identified, it might be tested to verify that it operates according to the requirements. If multiple communications channels have been identified, they might all be tested to determine their relative levels of performance. Then, in step S812, the communications channel selecting unit 418 selects the initial communications channel that will be used to carry the telephony communication. Subsequently, the methods ends.

In some embodiments, if very recent tests have been performed on a communications channel, the testing that is to be performed in step S810 may be omitted. In that event, in step S812, the recent test results would be used to select the communications channel that will be used to carry the telephony communication.

FIG. 5 illustrates a communications channel setup unit 500 that can be present on an IP telephony device. The communications channel setup unit is responsible for setting up a communications channel for a telephony communication in much the same way as the communications channel information unit 400.

The communications channel setup unit includes an element information obtaining unit 502 that obtains information about elements that can be used to establish a communications channel. This information could be obtained from the elements themselves, or by conducting testing on elements. Also, the element information obtaining unit 502 could obtain such information from the communications channel information unit 400 of an IP telephony system.

The communications channel setup unit 500 includes several units which perform the same actions described above for the corresponding units of the communications channel information unit 400. These include a communications channel requirements identification unit 504, a communications channel identification unit 506, a communications channel testing unit 508 and a communication channel selecting unit 510. Because the functions of these units have already been described, their functions will not be repeated here.

The communications channel testing unit 508 may operate in a somewhat different fashion than the corresponding communications channel testing unit 416 of the communication channel information unit 400. Specifically, the testing that is conducted by the communication channel testing unit 508 may be conducted from the perspective of the telephony device which hosts the communications channel setup unit 500. Under some circumstances, this may lead to more accurate test results. Also, the communication channel testing unit 508 which is part of the communications channel setup unit 500 may be capable of exchanging information with the communications channel testing unit 416 of the communications channel information unit 400.

The method illustrated in FIG. 8 could be performed by the communications channel setup unit 500 of a telephony device in essentially the same way as is described above for the communications channel information unit 400. However, during step S808, the information that is obtained might be obtained in a different way. For example, the information may be obtain all or in part from previous calls that have been conducted, or from the communications channel information unit 400.

Also, during step S810, the testing might be conducted in a different way. For example, an application on a telephony device could send data simulating a call through a channel that extends to the desired endpoint telephony device. But the data would not actually setup a call to that endpoint telephony device. Instead, the channel, and the transmitted data, would only extend to the element closest to the endpoint telephony device. This will provide a good indication of the quality of a channel without actually involving the endpoint telephony device in a real call.

Also, testing performed by the communications channel setup unit 500 of a telephony device may need to be performed more frequently. For example, if the telephony device is a mobile telephony device, and the device is moving from one access point or cell tower to the next, the conditions may change quite rapidly, necessitating more frequent testing to verify that the call will continue to be conducted with high quality.

Figure 9:
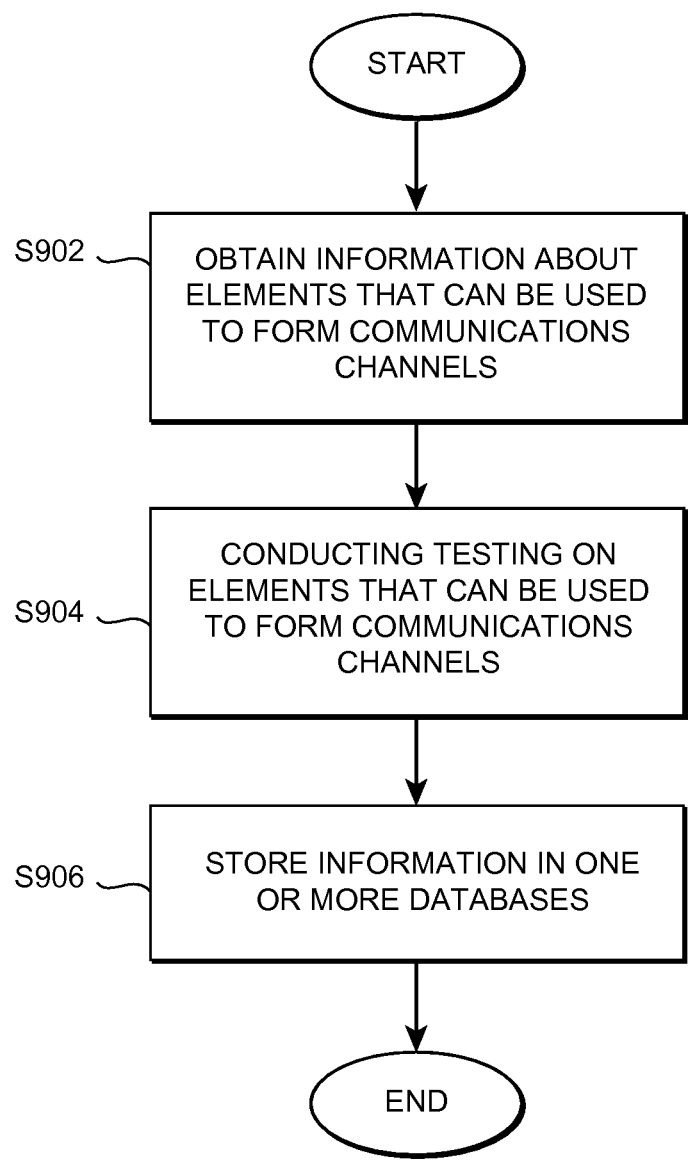
FIG. 9 is a flowchart illustrating steps of a method embodying the invention for obtaining and storing information about the capabilities and current data communication capacities of various elements of a data network that can be used to establish communications channels.

FIG. 9 illustrates steps of a method which can be performed to obtain and store information about the elements that can be used to establish a communications channel. This method could be performed by either the communications channel information unit 400 of an IP telephony system, or by the communications channel setup unit 500 of an IP telephony device.

The method begins and proceeds to step S902, wherein information about elements that could be used to form a communications channel is obtained. As explained above, this could include obtaining such information directly from the elements themselves, either by querying the elements, or because the elements self-report such information. The information might also be obtained from a third party that is responsible for operating or maintaining the elements.

In step S904, testing is conducted on elements to derive information about the capabilities and performance of the elements. This testing could be conducted by the element testing unit 404 of a communications channel information unit 400, or by other devices or systems. In step S906, the information obtained in steps S902 and S904 is stored in one or more databases. Information that is ultimately stored in databases might also be acquired as one or more elements of an IP telephony system are used to conduct actual telephony communications. In other words, testing may not be the only way to acquire information about the capabilities and performance of elements of a data network. Actual use of the elements may also generate such information. If an IP telephony device acquires such information during the testing of a potential communication channel or by conducting an actual telephony communication, the IP telephony device forwards the acquired information to the element information gathering unit 402 of the communications channel information unit 400 for storage in one or more databases.

The requirements for a communications channel may change after a communications channel has been put into use. If that occurs, it may be necessary to modify the communications channel to accommodate the change in the requirements. A requirement change identification unit 420 and communication channel modification unit 424 of the communications channel information unit 400 may be responsible for identifying a change in requirements and for acting to modify the communications channel. Alternatively, a requirement change identification unit 512 and communication channel modification unit 516 of the communications channel setup unit 500 may be responsible for identifying a change in requirements and for acting to modify the communications channel.

Figure 10:
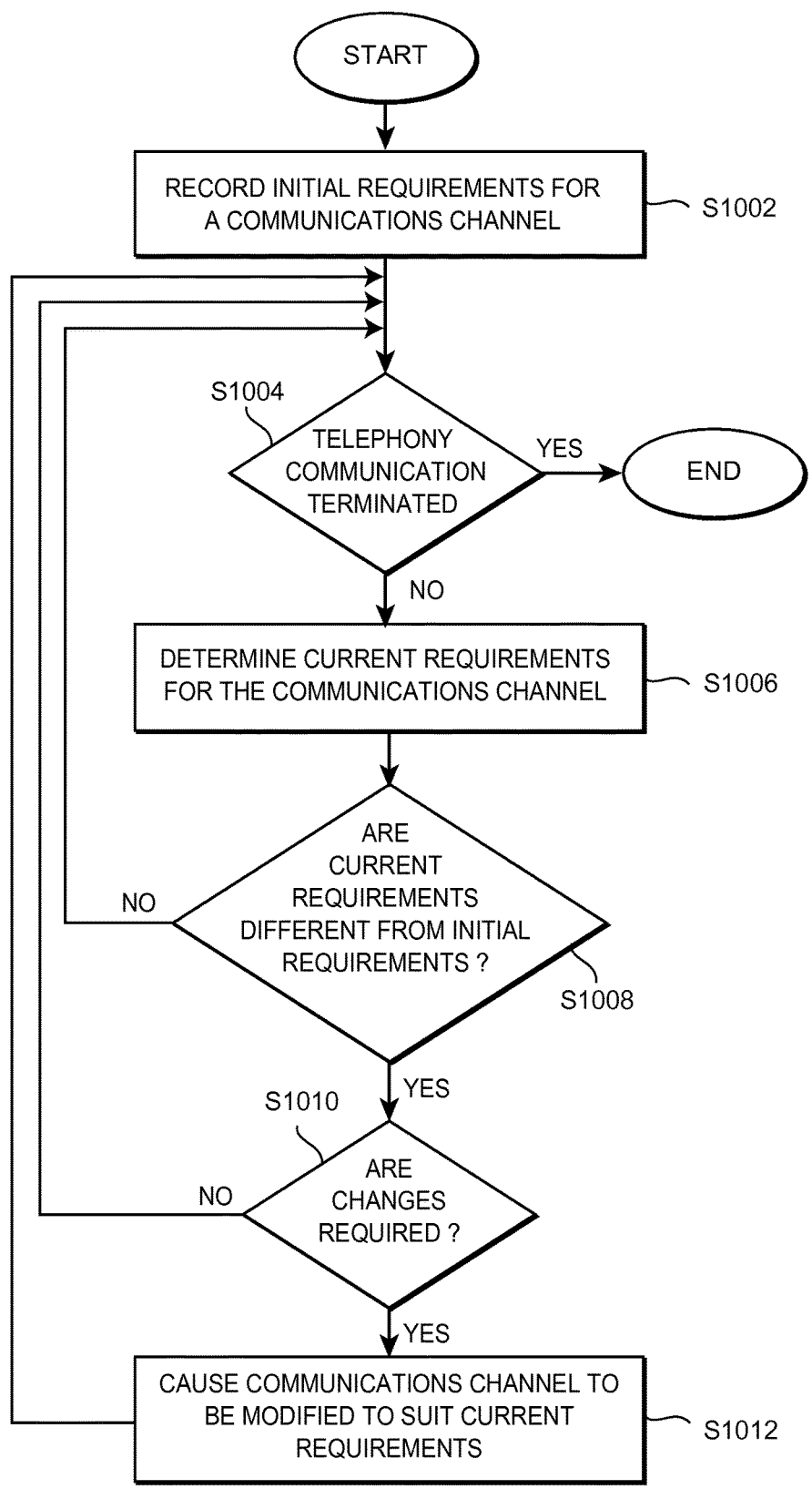
FIG. 10 is a flowchart illustrating steps of a method embodying the invention for modifying a communications channel when the requirements for the communications channel change.

A method for identifying a change in communications channel requirements and for modifying a communications channel is illustrated in FIG. 10. As shown therein, the method begins and proceeds to step S1002 where the initial requirements for a communications channel are recorded. This could occur when the communications channel is being established, or immediately after a communications channel has been established and put into operation. Next, in step S1004, a check is performed to determine if the telephony communication has been terminated by either party. If so, the method ends. If not, the method proceeds to step S1006 where the current requirements for the communications channel are determined. This step could be performed by the requirement change identification unit 420/512 or by the communications channel requirements identification unit 412/504. In step S1008, the requirement change identification unit 420/512 checks to determine if the current requirements are different from the initial requirements. If not, the method loops back to step S1004. If so, in step S1010, a check is performed to determine if it is necessary to modify the communications channel to accommodate the change in requirements. If not, the method loops back to step S1004. If so, the method proceeds to step S1012, where the communications channel modification unit 424/516 acts to modify the communications channel so that it accommodates the change in requirements.

An example of a situation where a change in requirements might trigger the modification of a communications channel could involve the application of noise reduction techniques. Assume that a user is conducting a telephone call with a mobile telephony device, and that the user begins the call from a quiet location. If the user continues the call while moving to a location with a significant amount of ambient noise, it would be desirable to begin applying noise cancellation techniques to help maintain good call quality.

If the initial communications channel selected for the call does not include an element capable of applying noise cancellation techniques to the data traversing the communications channel, it is possible to modify the communications channel to insert a new element that can provide noise cancellation.

Situations can also arise where the initial communications channel is capable of satisfying the requirements for the communications channel, but where over time, one or more of the elements undergoes a change which results in the element no longer being capable of satisfying the requirements. For example, a media relay that is part of a communications channel might be capable of communicating data packets at a sufficiently high bit rate to provide a high level of call quality when a call is first established. However, during the call, the media relay might become involved in carrying the data traffic for several additional calls. The load imposed by the additional calls might make it impossible for the media relay to continue to communicate data packets at a sufficiently high bit rate to satisfy the quality requirement for the first call.

Figure 11:
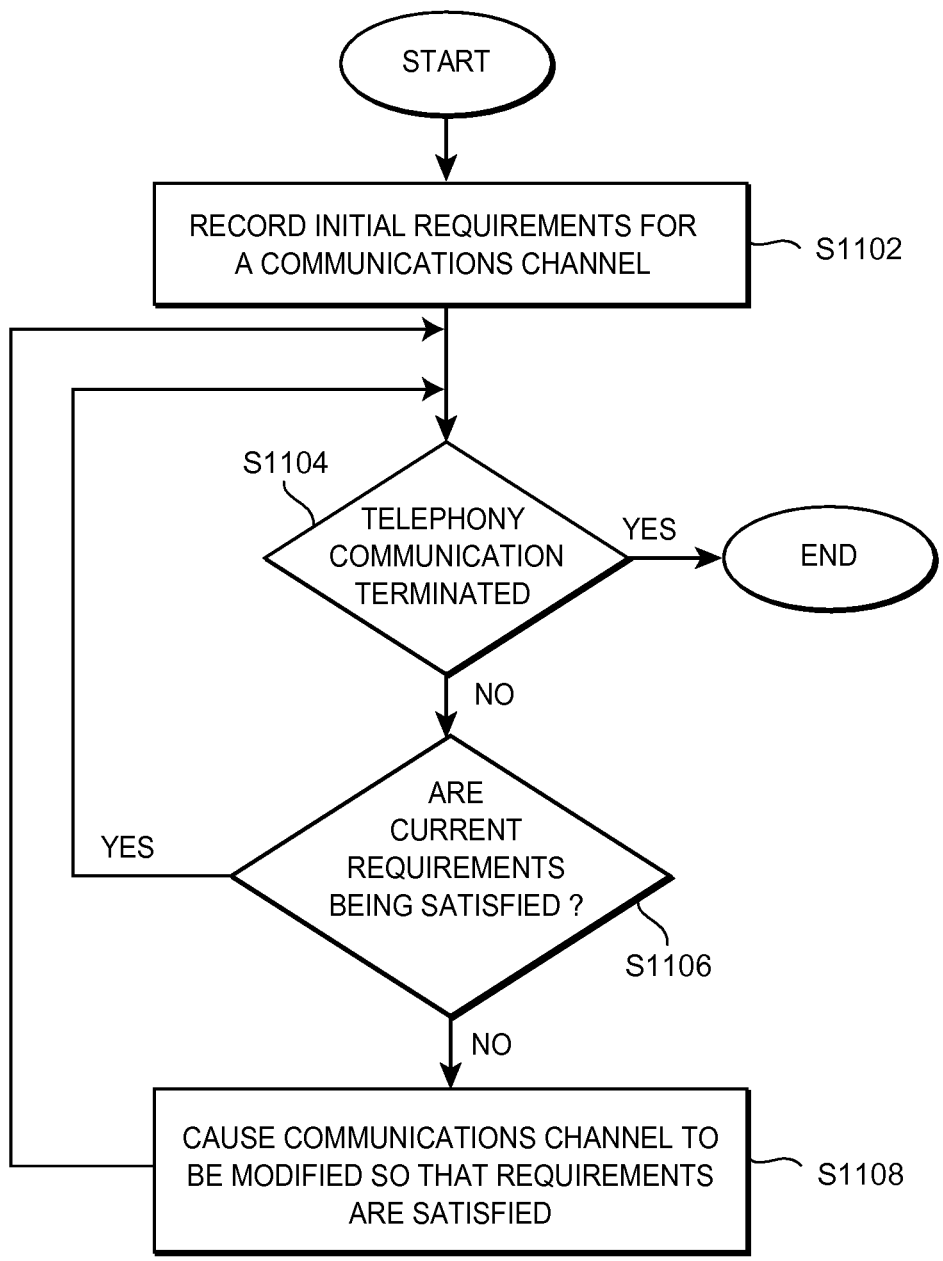
FIG. 11 is flowchart illustrating steps of a method embodying the invention for modifying a communications channel when one or more elements of the communications channel can no longer satisfy the requirements for the communications channel.

FIG. 11 illustrates steps of a method of identifying when one or more elements is no longer capable of satisfying the requirements for a communications channel, and for modifying the communications channel when that problem is identified so that the communications channel requirements can be satisfied. The method begins and proceeds to step S1102, where the initial requirements for a communications channel are recorded. This could occur when the communications channel is being setup, or shortly after the communications channel is setup and put into operation. In step S1104, a check is performed to determine if either party to the communication has terminated the communication. If so, the method ends. If not, the method proceeds to step S1106 where a communications channel monitoring unit 422 of a communications channel information unit 400 or a communications channel monitoring unit 514 of a communications channel setup unit 500 checks to determine if the initial requirements are being satisfied.

If the initial requirements are being satisfied by the elements of a communications channel, the method loops back to step S1104. If the requirements are no longer being met, then in step S1108, a communications channel modification unit 424/516 modifies the communications channel to ensure that the initial requirements can be satisfied. For example, if a media relay that was part of the initial communications channel can no longer provide sufficiently high call quality, the communications channel modification unit 424/516 could act to substitute a different media relay into the communications channel. A similar action could occur to switch a user's mobile telephony device from a first wireless access point to a second wireless access point.

A method as illustrated in FIG. 11 allows the IP telephony system or an IP telephony device to take proactive steps to modify a communications channel to ensure that call quality remains high.

While the above description identified the elements of a communications channel information unit 400 that could be part of an IP telephony system 120, not all of the elements would necessarily be a part of all embodiments. Similarly, a communications channel information unit 400 could also include additional units that have not been discussed.

Likewise, the above description identified the elements of a communications channel setup unit 500 that could be resident on an IP telephony device, not all of the elements discussed above would necessarily be a part of all embodiments. Similarly, a communications channel setup unit 500 could also include additional units that have not been discussed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of selecting a communications path for data packets bearing media of a telephony communication, comprising:

receiving a request to identify an initial communications channel which is to be used to communicate the data packets bearing the media of the telephony communication between an originating telephony device and a destination telephony device;

identifying requirements for the initial communications channel by, at least, identifying whether it will be necessary to convert a format of the data packets traversing the initial communications channel at any point between the originating telephony device and the destination telephony device;

obtaining information about capabilities of at least one media relay which could be used to form at least a portion of the initial communications channel between the originating telephony device and the destination telephony device;

selecting a first plurality of individual elements that could be used to form a first communications channel between the originating telephony device and the destination telephony device;

selecting a second plurality of individual elements that could be used to form a second communications channel between the originating telephony device and the destination telephony device;

causing tests of the first and second communications channels to be conducted; and selecting one of the first and second communications channels, as the initial communications channel that will be used to communicate the data packets bearing the media of the telephony communication between the originating telephony device and the destination telephony device, based on a result of the tests.

2. The method of claim 1, wherein said identifying further comprises identifying a required quality level for the initial communications channel.

3. The method of claim 1, wherein said identifying further comprises identifying a required cost level for the initial communications channel.

4. The method of claim 1, wherein said identifying further comprises identifying a format for communications that will traverse the initial communications channel.

5. The method of claim 1, wherein said identifying further comprises identifying whether it will be necessary or desirable to perform at least one of noise cancellation and echo cancellation on the data packets traversing the initial communications channel.

6. The method of claim 1, wherein said obtaining further comprises obtaining information about a quality of one or more data connections that a media relay that could be used to form a portion of the initial communications channel has with other elements that could be used to form the initial communications channel between the originating telephony device and the destination telephony device.

7. The method of claim 1, wherein said obtaining further comprises obtaining information about data communications bandwidth that is presently available to an element which could be used to form at least a portion of the initial communications channel.

8. The method of claim 1, wherein said obtaining further comprises obtaining information about a cost of using an element which could form at least a part of the initial communications channel.

9. The method of claim 1, wherein said obtaining further comprises obtaining information about a quality of one or more data connections that an Internet service provider that could be used to form at least a portion of the initial communications channel has with other elements that could be used to form a portion of the initial communications channel between the originating telephony device and the destination telephony device.

10. The method of claim 1, wherein said obtaining further comprises obtaining information about a quality of a data connection between the originating telephony device and at least one wireless access point that is in communication with the originating telephony device.

11. The method of claim 1, wherein said obtaining further comprises obtaining information about a quality of a data connection between the destination telephony device and at least one wireless access point that is in communication with the destination telephony device.

12. The method of claim 1, wherein said selecting comprises selecting at least one element for the initial communications channel because it provides functionality that is required for the initial communications channel.

13. The method of claim 1, wherein said selecting comprises selecting an Internet service provider that will be used by at least one of the originating telephony device and the destination telephony device to communicate data packets bearing the media of the telephony communication.

14. The method of claim 1, wherein said selecting comprises selecting a wireless access point that will be used to form part of the initial communications channel.

15. The method of claim 1, wherein said causing comprises causing the tests of the first and second communications channels to be conducted from at least one of the originating telephony device and the destination telephony device.

16. The method of claim 1, wherein selecting the plurality of individual elements includes identifying the plurality of individual elements configured to transferring data packets bearing the telephony communication and that satisfy the identified requirements of the initial communications channel.

17. The method of claim 1, wherein the tests of the first and second communications channels are conducted when setting up the initial communication.

18. The method of claim 1, wherein the tests of the first and second communications channels are conducted prior to selecting the initial communications channel used for conducting the telephony communication.

19. The method of claim 1, further comprising determining if at least one element is configured to supporting one or more CODECS.

20. A system for selecting a communications path for data packets bearing media of a telephony communication, comprising:
    means for receiving a request to identify an initial communications channel which is to be used to communicate the data packets bearing the media of the telephony communication between an originating telephony device and a destination telephony device;
    means for identifying requirements for the initial communications channel by, at least, identifying whether it will be necessary to convert a format of the data packets traversing the initial communications channel at any point between the originating telephony device and the destination telephony device;
    means for obtaining information about capabilities of at least one media relay which could be used to form at least a portion of the initial communications channel between the originating telephony device and the destination telephony device;
    means for selecting a first plurality of individual elements that could be used to form a first communications channel between the originating telephony device and the destination telephony device, and for selecting a second plurality of individual elements that could be used to form a second communications channel between the originating telephony device and the destination telephony device; and
    means for testing the first and second communications channels,
    wherein one of the first and second communications channels is selected, as the initial communications channel that will be used to communicate the data packets bearing the media of the telephony communication between the originating telephony device and the destination telephony device, based on a result of the tests.

21. A system for selecting a communications path for data packets bearing media of a telephony communication, comprising:
    a communications channel setup unit that receives a request to identify an initial communications channel which is to be used to communicate the data packets bearing the media of the telephony communication between an originating telephony device and a destination telephony device;
    a communications channel requirements identification unit that identifies requirements for the initial communications channel by, at least, identifying whether it will be necessary to convert a format of the data packets traversing the initial communications channel at any point between the originating telephony device and the destination telephony device;
    an element information obtaining unit that obtains information about capabilities of at least one media relay which could be used to form at least a portion of the initial communications channel between the originating telephony device and the destination telephony device;
    a communications channel selecting unit that selects a first plurality of individual elements that could be used to form a first communications channel between the originating telephony device and the destination telephony device, and also selects a second plurality of individual elements that could be used to form a second communications channel between the originating telephony device and the destination telephony device; and
    a communications channel testing unit that causes tests of the first and second communications channels to be conducted,
    wherein the communication channel selecting unit selects one of the first and second communications channels, as the initial communications channel that will be used to communicate the data packets bearing the media of the telephony communication between the originating telephony device and the destination telephony device, based on a result of the tests.

22. The system of claim 21, wherein the communications channel requirements identification unit identifies a required quality level for the initial communications channel.

23. The system of claim 21, wherein the communications channel requirements identification unit identifies a format for communications that will traverse the initial communications channel.

24. The system of claim 21, wherein the element information obtaining unit also obtains information about a quality of one or more data connections that a media relay which could be used to form at least a portion of the initial communications channel has with other elements that could be used to form the initial communications channel between the originating telephony device and the destination telephony device.

25. The system of claim 21, wherein the element information obtaining unit also obtains information about data communications bandwidth that is presently available to an element which could be used to form at least a portion of the initial communications channel.

26. The system of claim 21, wherein the element information obtaining unit also obtains information about a quality of a data connection between either the originating telephony device and at least one wireless access point that is in communication with the originating telephony device or between the destination telephony device and at least one wireless access point that is in communication with the destination telephony device.

27. The system of claim 21, wherein the communications channel selecting unit selects a wireless access point that will be used to form part of the initial communications channel.

28. The system of claim 21, wherein the communications channel testing unit that causes the tests of the first and second communications channels to be conducted from at least one of the originating telephony device and the destination telephony device.

\* \* \* \* \*